April 1, 1930.  P. R. BASSETT  1,753,144
UNATTENDED BEACON
Filed June 20, 1923  2 Sheets-Sheet 1
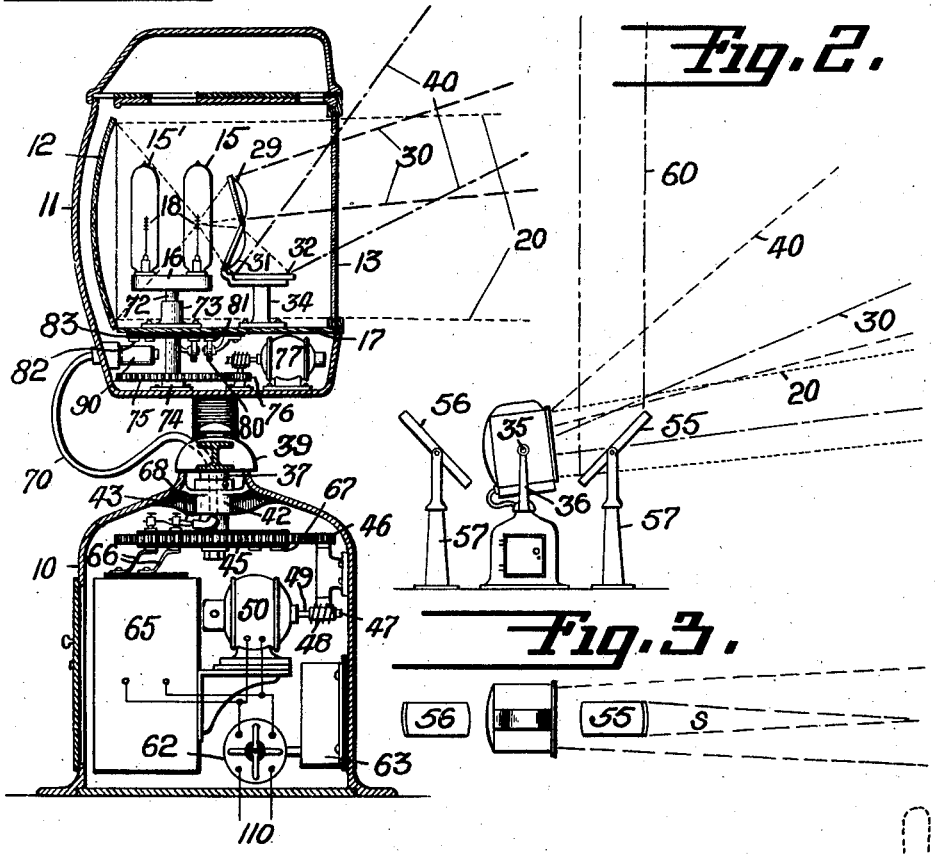

April 1, 1930.　　　　P. R. BASSETT　　　　1,753,144
UNATTENDED BEACON
Filed June 20, 1923　　　　2 Sheets-Sheet 2
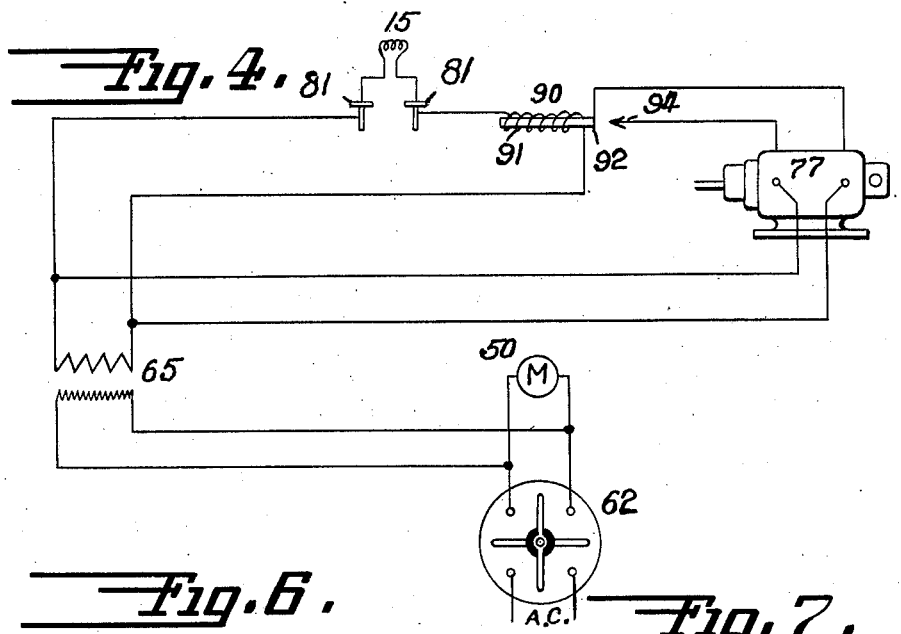
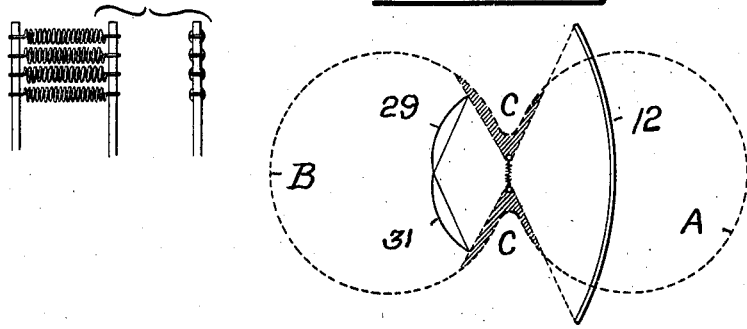
Inventor
PRESTON R. BASSETT.
By his Attorney
Herbert H. Thompson Patented Apr. 1, 1930

1,753,144

UNITED STATES PATENT OFFICE

PRESTON R. BASSETT, OF BROOKLYN, NEW YORK, ASSIGNOR, BY MESNE ASSIGNMENTS, TO SPERRY GYROSCOPE COMPANY, INC., A CORPORATION OF NEW YORK

UNATTENDED BEACON

Application filed June 20, 1923. Serial No. 646,651.

This invention relates to beacons or searchlights adapted particularly for guiding aircraft over land or water at night or in fog.

It is an object of this invention to provide an unattended beacon capable of operating automatically over an extended period without requiring the attention of an operator. To this end I employ as a source of light an incandescent lamp of suitable design in place of the arc formed between carbon electrodes which is the unit employed in the ordinary searchlight and which always requires the presence of an operator. To render the device entirely automatic, I provide a time-controlled switch for lighting or extinguishing the lamp, or if desired, a sun-controlled switch may be utilized to insure operation of the lamp between sunset and sunrise.

It is a further object of my invention to provide a searchlight which shall be effective over a maximum area. For this purpose I provide means for rotating the beacon while the lamp is burning, so that an aviator flying toward the lamp at any point within a circle whose radius is the maximum range of the beacon will be guided thereby.

Further this invention has for its object the provision of a searchlight beacon which shall be visible to the aviator within the entire range of the light as the aircraft approaches it. For this purpose, I make provision for a plurality of light beams inclined at different angles to the horizontal so as to be visible to the aviator at different distances from the light. Each beam is of such intensity and so positioned as to be clearly visible at a time when the preceding beam would ordinarily become invisible to the aviator.

A further object is the provision of a searchlight which not only is effective over a maximum range but which produces also a vertical beam simultaneously with the range beams. This beam is of great utility particularly in fogs when the range beams are diffused and not readily visible at a distance. To render the vertical beam highly effective provision is made for an intermittent flashing of this beam rather than for continuous illumination.

Since the beacon is designed to be unattended, it is an object of this invention to provide means for automatically substituting a new incandescent lamp when the lamp employed burns out or the current therethrough fails for some other reason. The substitution is accomplished without delay so that there is no substantial failure of the beacon due to this cause.

Other objects and advantages of this invention will be in part obvious and in part specifically referred to hereinafter.

In the accompanying drawings:

Fig. 1 is a vertical section through a beacon or searchlight embodying my invention.

Fig. 2 is an exterior side view of the beacon showing the means for providing a vertical beam.

Fig. 3 is a plan view of the device as shown in Fig. 2.

Fig. 4 is a wiring diagram of the means for controlling the substitution of a new lamp for an old one.

Fig. 5 is a diagrammatic representation of the effect of the various beams produced by the beacon.

Fig. 6 is an enlarged front and side view of a lamp filament.

Fig. 7 is a diagrammatic view of the light generated and utilized by my invention.

Referring to the drawings, there is shown a searchlight or beacon comprising a base portion 10 and a head portion or drum 11 which may have the usual form. Within the drum, at the rear thereof, is fixed a parabolic mirror 12 adapted to reflect rays through the front window 13. The source of light is an incandescent lamp 15 supported upon a platform 16 mounted upon a base 17. The lamp is constructed of a few coils of wire 18 sufficiently compact to provide a suitable concentrated source of light. Preferably the coils 18 are formed of relatively thick wire with consequent low resistance and low voltage to yield a high amperage.

The coils 18 of lamp 15 are positioned at the focus of mirror 12 so that light produced by the lamp is reflected by said mirror as a cylindrical or slightly divergent beam 20. This beam utilizes all of the rear light generated by the lamp and will be visible at a distance which is the maximum range of the beacon. Referring to the diagram of Fig. 5, assuming the range of this beam to be 25 miles, the drum 11 is tilted upwardly to an angle such that the beam 20 will intersect the path of an aircraft, flying at the normal altitude of 4000 feet, 25 miles from the beacon.

In other words, the aviator is in the field of beam 20 at a distance of 25 miles from the source of light. It will be apparent however, that if the aviator maintains this altitude he will after a given point (here shown as 10 miles from the source) fly beyond or out of the top of this beam. Ordinarily, therefore, the aviator would lose sight of beam 20 and would thereafter be without guidance from this beacon.

By my invention I provide a second beam whose angle of inclination is such that at the given altitude it becomes effective to the aviator at a point where the first beam becomes ineffective. For this purpose I provide that a portion of the front light of lamp 15 be reflected through a lens 29 supported to project a beam 30 whose effective range (in the case illustrated) begins at 10 miles (where beam 20 becomes ineffective).

It may be that the aviator flying at the normal altitude will pass beyond beam 30 also, in which case it is desirable to provide a third beam which shall become effective substantially where the second beam becomes ineffective to the aviator. For this purpose another portion of the front light of the lamp 15 may be reflected through a lens 31 to a mirror 32 which reflects a beam 40 upwardly at a steeper angle than beam 30. Thus, beam 30 is shown as becoming ineffective to the aviator at a distance of about 4 or 5 miles from the source of light and beam 40 becomes effective at the same point.

While, for the purpose of description, each beam has been described as becoming effective where the other beam becomes ineffective, it should be understood that actually these beams may overlap to a greater or lesser extent.

The lenses 29 and 31 and mirror 32 may form a unit supported upon a stem 34 fixed to base 17. The coils of lamp 15 are preferably substantially in a single plane, here shown as a vertical plane (see Fig. 6). The fields of light will thus spread out from each face of this plane to form rear and front fields of light A and B (see Fig. 7). The light thus spreads practically in only two directions, front and rear, the side edges of the coils generating only slight fields of light CC. As shown by the dotted lines in Fig. 7, the reflector 12 utilizes practically all of the rear light thus generated, while the lenses 29 and 31 utilize practically all of the front light, so that there is only a negligible loss of the total light generated.

It will be apparent that beam 20 will be of greater intensity than beams 30 or 40, since it utilizes substantially all of the rear light of lamp 15 while the beams 30 and 40 utilize only a portion of the front light. The beam 30 is made of greater intensity than beam 40 by making the lens 29 of longer focal length, or greater subtended angle than lens 31 and hence, is dispersed to a lesser extent or gathers more light.

In order to render the beacon effective over a maximum field, I rotate the drum 11 so that the field covered by said beams is substantially a circle whose radius is the effective range of the longest beam. The drum is pivotally mounted about a horizontal axis 35 in arms 36 joined below to a cap 39 to the lower side of which is fixed a depending shaft 37. Said cap rotates upon the upper open end of casing 10, and the shaft 37 is journaled in a hub 42 fixed by brackets 43 within casing 10. The shaft projects through the hub and carries at its lower end a gear 45 which meshes with a pinion 46 at one end of a shaft having a worm gear 47 at its other end meshing with a worm 48 on the shaft 49 of a motor 50.

It will be obvious that a sufficient number of beams may be provided either directly or indirectly from the lamp to fill the entire field within its maximum range. In practice, however, it is advisable to project beams in overlapping or contiguous relation to a point near the source of light (in the case shown, about 1.5 miles). This leaves a distance (in the case shown, about 1.5 miles) in which the aviator would ordinarily be without guidance from this beacon. To provide additional guidance, I mount adjacent the searchlight one or more reflectors 55, 56 pivotally mounted in suitable fixed supports 57. These reflectors are so positioned that as the drum rotates a shaft of light will be shot directly upwardly in a vertical beam 60 for the period of time during which the light strikes the reflector. During each revolution two flashes of vertical light beams will be produced. As many reflectors similar to 55, 56 may be employed as it is desired to obtain flashes of vertical light beams during each revolution of the drum. The reflectors 55, 56 do not interfere to any consinderable extent with the beams 20, 30, for as shown in Fig. 3, the shadows cast by these reflectors is relatively short, seldom exceeding 30 or 40 ft. The intermittent vertical beams not only afford additional guidance to the aviator, but in foggy weather it may be the only effective guide since the more horizontal beams are dispersed under such weather conditions.

By providing a series of such beacons spaced apart a distance equal to the maximum range of each beacon (the radius of the illuminated area) an aviator on passing through the fields of the various beams 20, 30, 40 and 60 will find himself in the field of the next beacon. A continuous guidance for flying at night is thus obtained. Since the field of illumination created by each beacon is circular due to the rotation of drum 11, the beacons will be effective regardless of the direction from which they are approached.

It is thus apparent that a separate optical system with separate optical apparatus is provided for projecting each beam.

These beacons are adapted to be unattended for comparatively long periods of time, especially when they are positioned in isolated places to serve as one of a chain of guides for the aviator in night flying. Means may therefore be provided for automatically lighting and extinguishing the beacon. For this purpose the beacon is operated by current which may be delivered from a 110 volt circuit through a switch 62 connected to a clock 63 having a capacity of 30 days or longer, or it may be a usual type of electric self-winding clock. Said clock is set to operate at given intervals of, say, 12 hours, so that the switch is turned to "on" position each evening and to "off" position the corresponding next morning. If desired, this division of time may be varied, clocks for these purposes being well-known in the electric-sign art. The switch may also be controlled by the well-known sun-meter or daylight meter so that said switch will be operated to "on" position when there is an absence of daylight. When the switch is turned on the current is supplied to the motor 50 to rotate the drum.

The main portion of the current supplied is utilized for the lamp 15. The voltage is stepped down by the transformer 65 and the current is delivered through brushes 66 beneath gear 45 to contacts 67 above said gear by way of insulated bolts, and from said contacts 67 by leads 68 through the interior of shaft 37, which is hollow, and thence by conduit 70 to the interior of drum 11.

A further requisite of an unattended beacon is reliability in the source of light, in this case the special type of incandescent lamp shown and described. If for any reason this lamp should fail, the beacon would cease functioning for a considerable period until the deficiency was discovered. To obviate this difficulty, I provide a plurality of lamps 15, 15' (in this case, two) which I mount upon the platform 16. Said platform is fixed to the upper end of a shaft 72 extending through a fixed hub 73 and supported in a bearing 74. Said shaft has fixed thereto a gear 75 which meshes with a pinion 76 driven from a motor 77. The current for the motor is taken from the leads extending through conduit 70, said leads being connected also to the fixed contacts 80. Said contacts are adapted to engage contact strips 81 or 82 carried by an insulator plate 83 fixed to shaft 72 and rotatable therewith. Lamp 15 is connected to contact-strips 81 and lamp 15' is connected to contact-strips 82, so that lamp 15 or 15' will be effective depending upon which of said strips are in engagement with the contacts 80. In circuit with the contacts 80, and hence with the lamp in effective position, is a circuit-closer 90 (see Fig. 4) comprising a coil 91 and core 92. When the lamp in effective position is burning, the core 92 is drawn away from a contact 94 controlling the circuit through motor 77. Should the lamp in effective position (in this case, 15) burn out or fail for some other reason, the core 92 would no longer be drawn into coil 91 but would engage contact 94 to close the circuit through motor 77 and rotate platform 16 and insulator plate 83 (both fixed to shaft 72). When contact strips 82 engaged contacts 80 the circuit would again be closed through coil 91 which would draw in core 92 and break the circuit through the motor 77. In this position the lamp 15' would be effective at the focus of reflector 12 until it ceased to function.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described my invention what I claim and desire to secure by Letters Patent is:

1. In a beacon, a source of light, means for reflecting all of the light at the rear of said source to form a beam, and a plurality of condensers for utilizing various portions of the light at the front of said source to project a plurality of beams at progressively increasing angles to said first beam.

2. In a beacon, a source of light, means for reflecting all of the light at the rear of said source to form a beam, and a plurality of condensers for utilizing various portions of the light at the front of said source to project a plurality of beams at progressively increasing angles to said first beam, the focal lengths of said condensers being predetermined to yield beams which diminish in intensity as their angles of inclination to said first beam increase.

3. In a beacon, a single source of light, means for projecting a plurality of continuous beams from said source at various angles to the horizontal, and means for simultaneously projecting an intermittent vertical beam.

4. In a beacon, a single source of light, means for projecting a plurality of continuous beams from said source at various angles to the horizontal, and means for simultaneously projecting a plurality of successive intermittent vertical beams.

5. In a beacon, a single source of light, means for projecting a plurality of continuous beams from said source, means for rotating said source and said first-named means and means rendered effective during the rotation of said beacon for projecting a vertical beam.

6. In a beacon, a single source of light, means for projecting a plurality of continuous beams from said source, means for rotating said source and said first-named means and a relatively fixed reflector in the path of said beams adapted to project a vertical beams once during each revolution of said source.

7. In a beacon, a single source of light, means for projecting a plurality of continuous beams from said source, means for rotating said source and said first-named means, and a plurality of relatively fixed, spaced reflectors in the path of said beams each adapted to project a vertical beam once during each revolution of said source to provide successive, intermittent, vertical beams.

8. In a beacon, a source of light, a plurality of spaced reflectors, and means for rotating said source of light so that the rays therefrom strike said reflectors successively once during each rotation of said source.

In testimony whereof I have affixed my signature.

PRESTON R. BASSETT.